United States Patent
Scheible et al.

(10) Patent No.: US 7,489,441 B2
(45) Date of Patent: Feb. 10, 2009

(54) MONOCRYSTALLINE OPTICAL COMPONENT WITH CURVED SURFACE AND MULTILAYER COATING

(75) Inventors: Patrick Scheible, Aalen (DE); Guenter Scheible, legal representative, Stuttgart (DE); Sigrid Scheible, legal representative, Stuttgart (DE); Harald Schink, Aalen (DE); Alexander Hirnet, Ellwangen (DE)

(73) Assignee: Carl Zeiss SMT AG, Oberkochen (DE)

( * ) Notice: Subject to any disclaimer, the term of this patent is extended or adjusted under 35 U.S.C. 154(b) by 226 days.

(21) Appl. No.: 11/130,173

(22) Filed: May 17, 2005

(65) Prior Publication Data

US 2005/0286827 A1 Dec. 29, 2005

Related U.S. Application Data

(60) Provisional application No. 60/571,502, filed on May 17, 2004.

(51) Int. Cl.
*C30B 29/60* (2006.01)
(52) U.S. Cl. .................. 359/355; 117/902; 359/580
(58) Field of Classification Search ................ 359/350, 359/355, 359, 577, 580, 581, 586–590; 117/902
See application file for complete search history.

(56) References Cited

U.S. PATENT DOCUMENTS

| | | | |
|---|---|---|---|
| 5,963,365 A | 10/1999 | Shirai | |
| 6,261,696 B1 | 7/2001 | Biro et al. | |
| 6,453,005 B2 | 9/2002 | Kaiser | |
| 6,683,714 B1 * | 1/2004 | Meda et al. | 359/355 |

2002/0163737 A1 11/2002 Kohler et al.

(Continued)

FOREIGN PATENT DOCUMENTS

DE 101 48 308 A1 9/2002

(Continued)

OTHER PUBLICATIONS

Yusuke Taki and Kenichi Muramatsu, Hetero-epitaxial growth and optical properties of $LaF_3$ on $CaF_2$, Thin Solid Films, 2002, pp. 30-37, vol. 420-421, Elsevier Science.

*Primary Examiner*—Leonidas Boutsikaris
*Assistant Examiner*—Mark Consilvio
(74) *Attorney, Agent, or Firm*—Sughrue Mion, PLLC

(57) ABSTRACT

An optical component has a substrate, on which at least one curved substrate surface is formed that defines an optical axis of the optical component, wherein the substrate surface is coated with a multilayer coating that is active in the ultraviolet region at a design wavelength $\lambda_0$ and includes a first layer, applied to the substrate surface, made from a first dielectric material and at least one second layer, applied to the first layer, made from a second dielectric material. The substrate consists essentially of a crystal material that has an axially parallel crystal direction, running parallel to the optical axis, and edge crystal directions perpendicular to edge regions of the curved substrate surface. An angle between the axially parallel crystal direction and the edge crystal directions is at least 17°, and the first layer has an essentially untextured layer structure. An anisotropy, caused by the substrate structure, in the optical properties of the multilayer coating can thereby be avoided.

9 Claims, 5 Drawing Sheets

U.S. PATENT DOCUMENTS

| | | | |
|---|---|---|---|
| 2003/0021015 A1* | 1/2003 | Maier et al. | 359/350 |
| 2003/0067679 A1* | 4/2003 | Allan et al. | 359/356 |
| 2003/0227670 A1* | 12/2003 | Taki | 359/355 |
| 2004/0036971 A1* | 2/2004 | McGuire, Jr. | 359/499 |
| 2004/0105170 A1 | 6/2004 | Krahmer et al. | |
| 2004/0218271 A1* | 11/2004 | Hartmaier et al. | 359/494 |

FOREIGN PATENT DOCUMENTS

| | | |
|---|---|---|
| WO | WO 01/01182 A1 | 1/2001 |
| WO | WO 02/093209 A2 | 11/2002 |
| WO | WO 03/009015 A1 | 1/2003 |

* cited by examiner

MONOCRYSTALLINE OPTICAL COMPONENT WITH CURVED SURFACE AND MULTILAYER COATING

This application claims priority from U.S. Provisional Application No. 60/571,502 filed on May 17, 2004. The disclosure of that application is incorporated herein by reference.

BACKGROUND OF THE INVENTION

1. Field of the Invention

The invention relates to an optical component comprising a substrate, on which at least one curved substrate surface is formed that defines an optical axis of the optical component, wherein the substrate surface is coated with a multilayer coating that is active in the ultraviolet light region at a design wavelength $\lambda_0$ and comprises a first layer, applied to the substrate surface, made from a first dielectric material and at least one second layer, applied to the first layer, made from a second dielectric material. The invention also relates to an optical imaging system comprising at least one such component, and to a method for producing optical components.

2. Description of the Related Art

In many areas of the application of optical systems, there is a rising need for powerful optical components whose optical properties are optimized for design wavelengths $\lambda_0$ in the deep ultraviolet (DUV) region or in the vacuum ultraviolet (VUV) region, in particular in the wavelength region between approximately 120 nm and approximately 260 nm. Radiation from this wavelength region is used, for example, in microlithography systems for manufacturing large-scale integrated semiconductor components or other finely structured components with the aid of wafer steppers or wafer scanners. In this case, a light source, for example a laser, illuminates via an illumination system a mask (reticle) whose image is imaged with the aid of a projection system onto a semiconductor wafer coated with a photoresist layer.

Since the cost-effectiveness of this method is decisively determined by the speed of an exposure operation, there is a need for optical systems with the lowest possible light losses between light source and wafer. Consequently, those surfaces of transparent optical components of the systems that are exposed to radiation are coated with so-called antireflection layers (AR layers) or reflection-reducing layers in order to increase their transparency or transmission. These antireflection coatings lead to an increase in transmission as long as the light losses that are introduced, for example, by absorption and scattering by the coating, remain small by comparison with the order of magnitude of the reduction in reflection. The reduction in reflection also serves to avoid false light or scattered light that can impair the imaging properties of high quality imaging systems.

In order to be able to produce ever finer structures, it is attempted, on the one hand, to enlarge ever further the image-side numerical aperture (NA) of the projection objective and of the illumination systems adapted thereto. On the other hand, ever shorter wavelengths are being used, for example 248 nm, 193 nm and 157 nm. Since only a few sufficiently transparent materials whose Abbé constants are, moreover, relatively close to one another are available in this wavelength region for the purpose of manufacturing the optical components, it is difficult to provide purely refractive system with adequate correction of chromatic aberrations. Consequently, widespread use is made for this wavelength region of catadioptric systems in which refracting and reflecting components, in particular lenses and mirrors with a curved reflective surface, are combined. The curved substrate surface of a concave mirror can be coated with a dielectric multilayer coating that serves to optimize the reflectance, and is denoted as a reflective coating or highly reflecting coating (HR layer). The use of concave rear surface mirrors (Mangin mirror) in catadioptric systems is likewise known.

Optical materials that are sufficiently transparent even at wavelengths below 193 nm principally include fluoride crystal materials such as monocrystalline calcium fluoride ($CaF_2$) or barium fluoride ($BaF_2$).

Again, a selection of available dielectric materials for constructing dielectric multilayer coatings with alternating high refractive index and low refractive index individual layers is limited in the case of known short wavelengths. At wavelengths of 193 nm or below, fluoride materials are preferred on the basis of their high transparency or a low material-specific absorption. Use is frequently made in this case of lanthanum fluoride ($LaF_3$) as high refractive index dielectric material, and of magnesium fluoride ($MgF_2$) as low refractive index dielectric material.

Studies on the growth behavior of lanthanum fluoride layers on calcium fluoride substrates and substrates made from synthetic silica glass are presented in the article entitled "Hetero-epitaxial growth and optical properties of $LaF_3$ and $CaF_2$" by Y. Taki and K. Muramatsu in: Thin Solid Films 420-421 (2002) pages 30 to 37. The authors demonstrate that lanthanum fluoride layers that have been applied to calcium fluoride substrates at temperatures of 250° C. by vacuum deposition and whose surfaces run parallel to (111) net planes (crystal lattice plane) of the crystalline substrate material grow epitaxially in an orderly fashion. When the lanthanum fluoride was deposited under the same vapor deposition conditions onto a substrate made from synthetic silica glass, the lanthanum fluoride layer had a polycrystalline structure with statistical crystallite orientation. The authors indicate that a defective crystallinity and a porous structure of lanthanum fluoride layers impair the optical transparency of the latter in the vacuum ultraviolet (VUV) region, while the epitaxial growth of lanthanum fluoride on <111>-oriented calcium fluoride very effectively diminishes the photoabsorption in the lanthanum fluoride layer.

WO 03/009015 presents optical components with calcium fluoride substrates whose surfaces are parallel or at an angle of at most 30° to a (111) plane of the crystal material. These substrate surfaces are coated with an epitaxially grown layer made from lanthanum fluoride and which is intended to have a dense structure with few defects, a high refractive index and low absorption losses.

The patent U.S. Pat. No. 5,963,365 presents various three-layer antireflection coatings that are intended to have a strongly reflection-reducing effect for design wavelengths in the range between 150 nm and 300 nm. It is proposed in this case to make the first layer, next to the substrate, from a low refractive index material, for example $MgF_2$ or $Na_3AlF_6$, with thin optical layer thicknesses of between $0.05\lambda_0$ and $0.15\lambda_0$, while the high refractive index and low refractive index layers lying thereupon are designed as quarter wavelength layers (optical layer thickness approximately $0.25\lambda_0$), $LaF_3$ being used respectively as high refractive index material. These multilayer coatings are intended to have a good reflection-diminishing effect on flat or weakly curved substrates made from synthetic silica glass up to a large incidence angle of the incident radiation of more than 40°.

The patent U.S. Pat. No. 6,261,696 B1 describes a coating method, the aim of which is to facilitate in conjunction with the use of fluoride-containing substrate materials the avoidance of the formation of color centers when coatings are produced with the aid of sputter techniques. A layer made from silicon oxide, beryllium oxide, magnesium oxide or magnesium fluoride with a layer thickness of 30 nm or less is applied as first layer to the substrate surface for this purpose. The protective layer is intended to prevent the plasma from penetrating into the substrate material, and to prevent color centers from being produced thereby.

Particularly for applications in the field of microlithography at high numerical apertures, optical components made from fluoride crystal material can occur that have strongly curved surfaces. It has been shown in investigations by the inventor that with such systems undesired variations in the transmission whose causes were unexplained sometimes occurred over the cross section of the optical system.

SUMMARY OF THE INVENTION

It is an object of the invention to provide an optical component made from a crystal material and comprising at least one curved substrate surface that is coated with a dielectric multilayer coating, which component is distinguished by high uniformity of the optical power over the entire substrate surface. It is a further object of the invention to provide an optical imaging system that can be used, in particular, in projection exposure machines for microlithography and is distinguished by a high total transmission that is uniform over the system cross section.

To address these and other objects, the invention according to one formulation of the invention, provides an optical component that has a substrate on which at least one curved substrate surface is formed that defines an optical axis of the optical component, wherein the substrate surface is coated with a multilayer coating that is active in the ultraviolet region at a design wavelength $\lambda_0$ and comprises a first layer, applied to the substrate surface, made from a first dielectric material and at least one second layer, applied to the first layer, made from a second dielectric material, wherein the substrate consists of a crystal material that has an axially parallel crystal direction, running parallel to the optical axis, and edge crystal directions perpendicular to edge zones of the curved substrate surface, and wherein an angle between the axially parallel crystal direction and the edge crystal directions is at least 17°, and the first layer has an essentially untextured layer structure.

The inventors have found that strongly curved substrate surfaces of calcium fluoride lenses or other optical components, constructed with a substrate made from monocrystalline material for the first layer growing during the coating process can exhibit under certain conditions an anisotropic surface that causes a corresponding anisotropy of the optical properties of the multilayer coating if the first layer grows in a largely epitaxial fashion and therefore continues the anisotropy of the substrate surface into the properties of the multilayer coating. If, by contrast, it is ensured by suitable selection of the coating material for the first layer and/or by suitable coating parameters during the coating process that the first layer next to the substrate is essentially untextured, and therefore has no prominent preferred directions locally or globally over the substrate surface, it is then possible to suppress the epitaxy such that anisotropy of the substrate surface cannot affect the optical properties of the growing multilayer coating. It is possible in this way with the aid of a suitable buffer layer that does not continue the crystal structure of the substrate to provide multilayer coatings having optical properties that are largely uniform over the entire substrate surface or vary only slightly.

The observed anisotropy of the substrate surface occurs to a substantial extent chiefly when different, low refractive index net planes (crystal lattice planes) of a crystal material are more or less parallel to the local profile of the substrate surface because of the curvature and/or the diameter of the substrate surface in various surface regions of a substrate surface. Particularly in those surface regions in which local substrate surface regions run essentially parallel to low index net planes, or perpendicular to low index crystal directions of the crystal material, the growth conditions of the first layer differ strikingly from adjacent surface regions of the substrate surface where high index planes abut the substrate surface. These differences generally effect anisotropy of the growth conditions. Consequently, the anisotropy is particularly pronounced whenever the curved substrate surface runs such that low index crystal directions of the crystal material are perpendicular to the substrate surface at at least two different surface regions of the substrate surface.

In cubic crystals, the angle between a <100> direction and a neighboring <110> direction is 45°, the angle between a <100> direction and a neighboring <111> direction is 54.7°, and the angle between a <111> direction and a neighboring <110> direction is 35.3°. Consequently, for example, in the case of a substrate whose axially parallel crystal direction is a <111> direction, a surface orientation essentially perpendicular to a <110> direction will occur in the edge zone at three locations offset in a circumferential direction (azimuthal direction) when the substrate surface is so strongly curved and/or has such a large diameter that the curvature suffices for an angle between the axially parallel crystal direction and the edge crystal directions to be at least 35.3°.

In preferred embodiments, the axially parallel crystal direction is in the vicinity of a low refractive index crystal direction of the crystal material. It can, for example, deviate by less than 150 or less than 10° from a <111>, <110> or <100> direction of the crystal material. Such components, for which the deviation angle is less than 5° or less than 20 or less than 1° from one of these low index crystal directions, are particularly customary in high performance optics for microlithography and in the case of other UV high performance optics, and can be rendered more useful than heretofore by the invention.

In one embodiment, the first layer consists of a low refractive index material, in particular essentially of magnesium fluoride. It has emerged that this material can be applied such that a substantially disordered substrate can be provided for the second layer, which lies thereupon, and, if appropriate, for following layers such that an epitaxial growth of the coating can be suppressed. Alternatively, other low refractive index dielectric materials, for example aluminum fluoride, lithium fluoride, chiolite ($Na_5Al_3F_{14}$) or cryolite ($Na_3AlF_6$) or silicon dioxide ($SiO_2$) can be used for the first layer.

The coating process can be controlled such that the first layer grows amorphously, at least in some regions, that is to say has no defined crystal structure, at least locally. It has proved to be advantageous for this purpose when the process temperature is set during the coating process to very low temperatures, in particular for temperatures of 180° C. or therebelow. It is possible thereby to reduce the surface diffusion of the impinging layer particles at the substrate, so that it is possible to inhibit the possibility of reorganization and to reduce or avoid the above-described effects caused by heteroepitaxy. Particularly in the case of such low coating temperatures, it is possible as an alternative to a first layer made from magnesium fluoride also to apply a largely disordered first layer of calcium fluoride. This amorphous $CaF_2$ layer has a low refractive index than crystalline $CaF_2$, that is to say is slightly low refractive index with reference to such a substrate.

The coating process can also be carried out such that the first layer is a polycrystalline layer having a multiplicity of crystallites with a substantially statistical distribution of crystallite orientations. The disadvantageous anisotropy of the hetero coating properties can likewise be suppressed by the polycrystalline first layer.

If it is desired for a layer design to have as first layer a high refractive index dielectric material whose refractive index is, for example, at least similar to that of lanthanum fluoride, then it is provided in some embodiments firstly to apply another high refractive index material, for example, gadolinium fluoride, in an appropriate thickness to the substrate surface before lanthanum fluoride is applied as further layer material. Both layers can then serve together as a high refractive index layer with an inhomogeneous refractive index which, however, has the advantage of an unordered layer structure by contrast with a pure layer made from lanthanum fluoride. Aluminum oxide ($Al_2O_3$), erbium fluoride ($ErF_3$), holmium fluoride ($HoF_3$), neodymium fluoride ($NdF_2$), samarium fluoride ($SmF_3$), terbium fluoride ($TbF_3$), titanium fluoride ($TiF_3$), yttrium fluoride ($YF_3$), ytterbium fluoride ($YbF_3$) or mixtures thereof, for example, can be used as an alternative to gadolinium fluoride.

In preferred embodiments, the optical component is a lens comprising a substrate made from a crystal material transparent to the radiation of the design wavelengths, wherein the multilayer coating is designed as a multilayer antireflection coating. Here, it is possible to obtain an optical component that is coated with a multilayer antireflection coating, has a spatially dependent transmittance and has a variation width of less than 1 percentage point over the cross section of a substrate surface.

Particularly in the case of lenses whose optical axis is essentially parallel to a low index crystal direction, a multifold radial symmetry of the transmittance was observed in the circumferential direction (azimuthal direction) of the lenses in the region of the edge zone in the case of conventional coatings on strongly curved substrate surfaces. In the case of <111>-oriented lenses, for example, this is also denoted, in a manner corresponding to the threefold symmetry of the <111> direction, as "3-fold waviness", and occurs in a corresponding way as 4-fold waviness in the case of <100>-oriented lenses, or as 2-fold waviness in the case of <110>-oriented lenses, for example. In preferred embodiments, the invention renders it possible to suppress this effect such that, for preferred embodiments, the transmittance in the region of the edge zone has a variation width (modulation height) in the circumferential direction that is less than 1 percentage point.

The invention is also useful in manufacturing highly reflecting mirrors in the case of which a highly reflecting dielectric multilayer reflective coating is applied to a mirror substrate made from a crystal material with a curved substrate surface. Consideration is given here, in particular, to concave mirrors that are designed as rear surface mirrors. Such Mangin mirrors can be used, for example, in catadioptric systems for color correction and for correcting the field curvature. The transparent mirror substrate can have the form in this case of a negative meniscus lens.

The invention also relates to an optical imaging system for imaging a first field surface into an optically conjugate second field surface with the aid of a number of optical components, at least one of the optical components being constructed in accordance with the invention. In such imaging systems, lenses with at least one strongly curved substrate surface are frequently located in the vicinity of a field surface at a location where the marginal ray height of the image is small by comparison with the principal ray height. This region is also denoted here as close-to-field region. The optical components with the curved substrate surface coated in accordance with the invention can be arranged in this case such that incidence angles of the incident radiation occur at this surface that include incidence angles of more than 30°. DE 101 48 308 (corresponding to U.S. 2002/0163737) shows by way of example illumination systems that comprise an imaging system that is denoted as a REMA objective and by means of which the exit surface of an upstream rod integrator is imaged into the exit plane of the illumination system onto a reticle located there. Provided at the entrance of the REMA objective is a meniscus lens that is concave toward the entrance and in the case of which both the entrance surface and the exit surface are strongly curved. Projection objectives for microlithography frequently have as last lens before the image plane a planoconvex lens whose entrance surface can be strongly curved. Consequently, the invention can also advantageously be used in the field of microlithography both in illumination systems and in the case of projection objectives.

In addition to emerging from the claims, the above features and further ones also emerge from the description and from the drawings, in which case the individual features can respectively be implemented on their own or separately in the form of subcombinations in one embodiment of the invention, and in other fields, and can constitute embodiments that are advantageous and intrinsically capable of protection.

DETAILED DESCRIPTION

Figure 1:
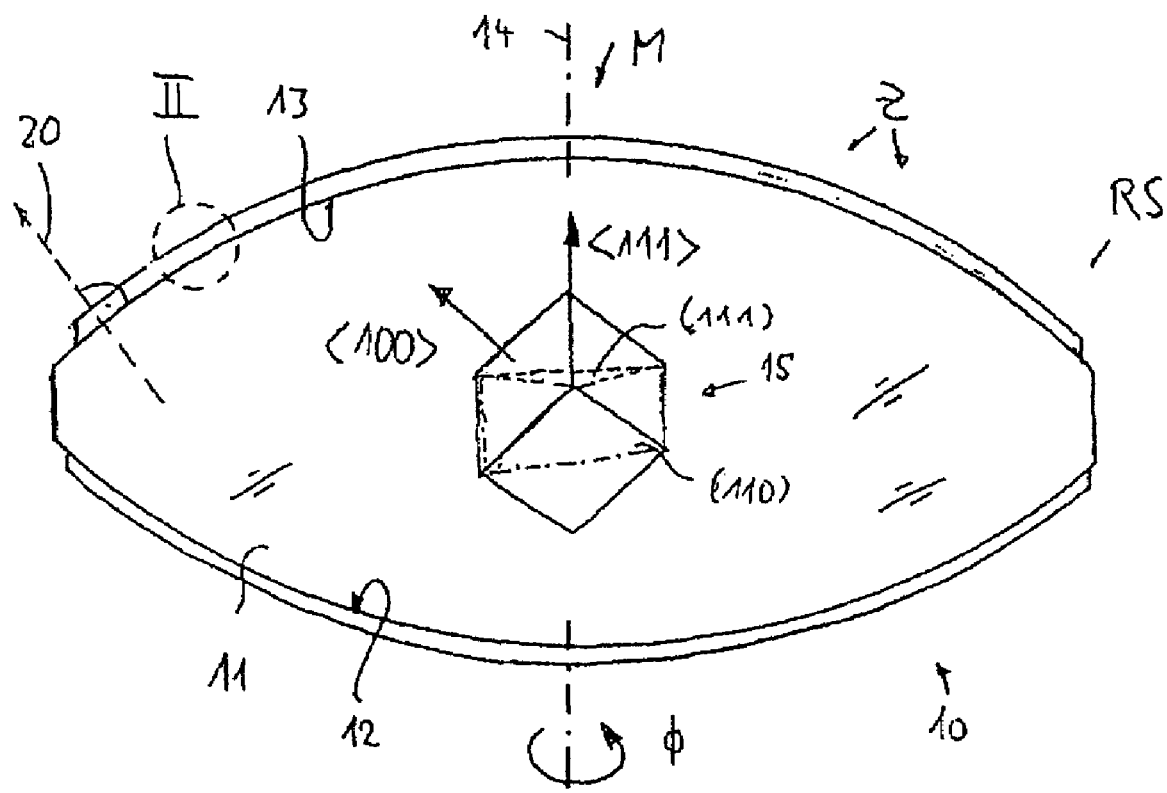
FIG. 1 shows a schematic of a biconvex positive lens made from <111>-oriented calcium fluoride with strongly curved lens surfaces.

The schematic in FIG. 1 shows an exemplary embodiment of an optical component according to the invention that is fashioned as a biconvex positive lens 10 with lens surfaces that are strongly curved on both sides. The lens has a substrate 11 made from monocrystalline calcium fluoride ($CaF_2$) at which two strongly convexly curved, spherical substrate surfaces 12, 13 are formed. The centers of curvature of the substrate surfaces define the optical axis 14 of the lens 10. The lens blank is cut from a circularly cylindrical calcium fluoride monocrystal whose longitudinal axis, prescribed by the growth direction, runs essentially parallel to a <111> direction of the crystal material. Such lenses, which are also denoted below as "<111>-oriented lenses", are frequently used in illumination systems of projection objectives for microlithography projection machines operating with radiation from the deep ultraviolet (DUV) region or vacuum ultraviolet (VUV) region. They are used, for example, in systems with a 193 nm operating wavelength in combination with lenses from synthetic silica glass (fused silica) for the purpose of color correction. Because of the fact that calcium fluoride has a lesser tendency to radiation-induced change in density (in particular compaction) by comparison with synthetic silica glass, calcium fluoride lenses are also used in regions of high radiant energy density, which in the case of optical imaging systems are frequently situated in the vicinity of field planes of the image (object surface, image surface, region of a real intermediate image).

The crystallographic orientation of a crystal material causes the substrate surfaces 12, 13 in the middle region M of the lens, that is to say in the vicinity of the optical axis 14, to run essentially parallel to (111) net planes of the crystal material. Such a net plane is shown by dashes inside the schematically illustrated unit cube 15 of the crystal material. Owing to the strong curvature of the substrate surfaces, which have a radius of curvature R that can be of the order of magnitude of the diameter D of the lens, the orientation of the curved substrate surface deviates strongly in the edge region RS of the substrate surface from a <111>-orientation. In the case of the example, an edge crystal direction 20 perpendicular to the edge region of the curved substrate surface is at an angle of substantially more than 30° to the axially parallel <111> crystal direction.

Because of the strong curvature of the substrate surface, the latter is strongly anisotropic in crystallographic terms, since different high index and low index net planes of the crystal material form the substrate surface at different points of the substrate surface. The result here for the <111>-orientation is a three-fold radial symmetry with reference to the optical axis 14. If, for example, the substrate surface is so strongly curved that an angle of approximately 35° or more is present in the edge region of the substrate surface between the axially parallel <111> direction and the surface normal direction 20, (110) net planes then occur in the edge zone at three geometrically mutually equivalent positions as surface-parallel planes, the piercing points of <110> directions being situated in each case offset by an azimuth angle Φ=1200 from one another. A (110) plane perpendicular to a <110> direction is illustrated by dots and dashes in the unit cube 15.

Figure 3:
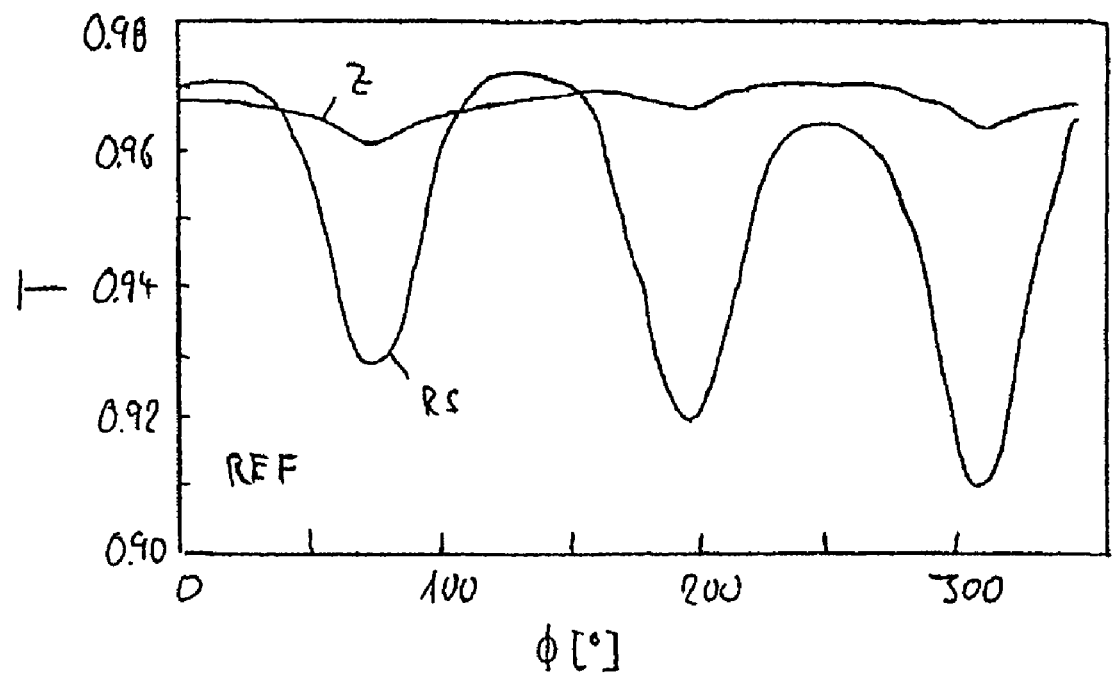
FIG. 3 shows a diagram in which the transmission of a lens is shown as a function of the azimuth angle for an edge region (RS) and for a zone region (Z) lying between optical axis and edge region, in the case of a conventionally coated reference lens.
Figure 4:
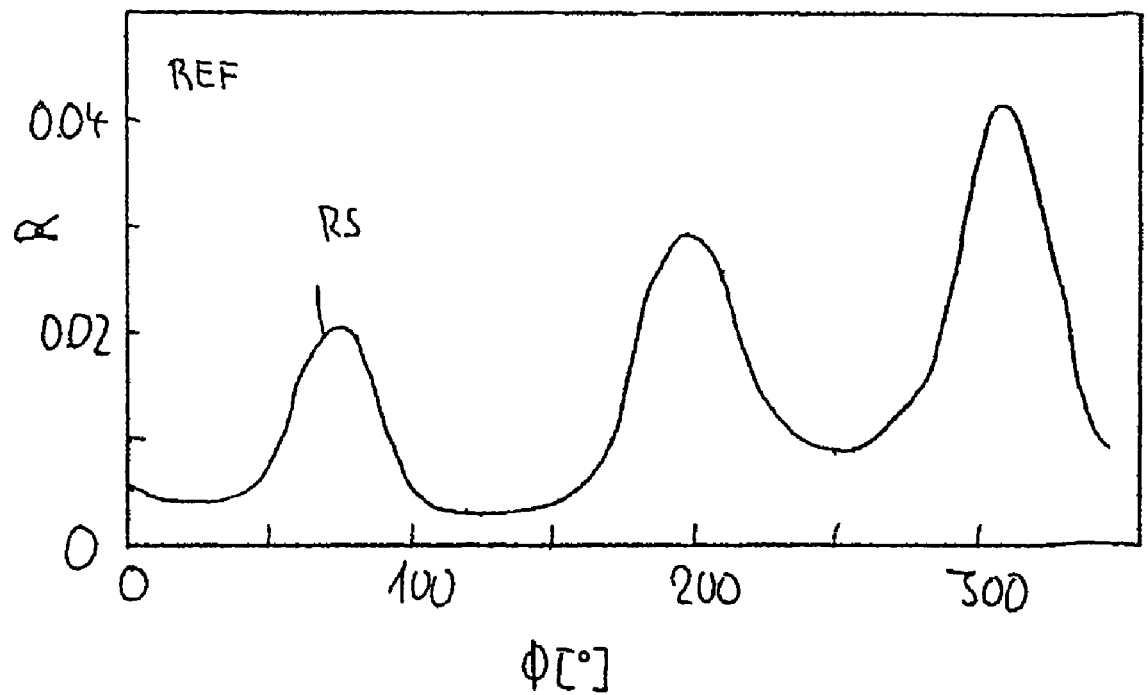
FIG. 4 shows a diagram in which the reflectance of the conventionally coated reference lens in the edge region (RS) is shown as a function of the azimuth angle.
Figure 5:
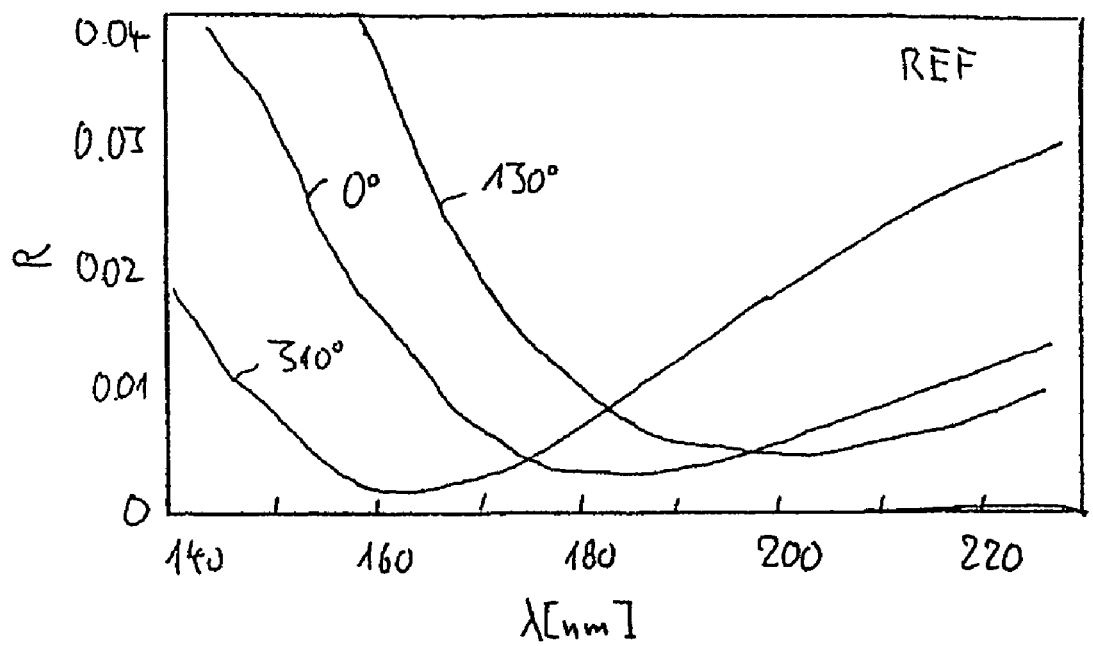
FIG. 5 shows a diagram in which the spectral position of reflection minima at various geometrically equivalent locations of the edge region of a conventionally coated reference lens is shown.

In order to explain the problems that can arise when coating monocrystalline substrates with strongly curved substrate surfaces, FIGS. 3 to 5 are firstly used to explain a few optical properties of a conventionally coated reference lens (REF) that had a <111>-oriented calcium fluoride substrate and strongly curved surfaces (angle between axially parallel crystal direction and edge crystal direction >30°). Both the substrate surfaces were coated with a 2-layer antireflection coating in which the first layer, resting directly on the substrate surface, consisted of lanthanum fluoride ($LaF_3$) and the second layer, lying thereover, consisted of magnesium fluoride ($MgF_2$). The layers of the 2-layer coating were applied in a conventional way at a coating temperature of the approximately T>200° C. by means of electron beam vaporization. The optical layer thicknesses (n·d) of the two layers were $(0.25)\lambda_0$ in each case, $\lambda_0$ being the desired wavelength of the coating (here 157 nm), n being the refractive index of the layer material, and d being the geometric layer thickness of the layer material.

The optical properties were determined during roundness measurements following the coating. During the roundness measurements, the lens is rotated about its optical axis, and the optical properties are respectively measured at a constant height (radial distance from the optical axis) while varying the azimuth angle Φ. Measurements were carried out both in the edge region RS of the coated substrate surface, as well as in the zone region Z (between optical axis and edge region) and in the middle region M near the optical axis. Denoted here as "edge region" is an annular region at the outer edge of the coating whose width in the radial direction is at most 20% of the radius of the coating.

During these roundness measurements, a strong modulation of the reflectance R and of the transmittance T with the azimuth angle Φ was observed in the edge region RS. It was possible to show by means of spectral measurements of the reflectance at different circumferential positions (given by azimuth angle Φ) that the principal cause of the strong modulation resides in a greatly different spectral position of the reflection minimum of the antireflection coating.

These results are documented in FIGS. 3 to 5. FIG. 3 illustrates the result of a roundness transmission measurement of a lens coated on both sides in a conventional way (2-layer coating, T>200° C.). A slight modulation of the transmission T (modulation height approximately 1 percentage point) is to be detected in the region of the zone (curve Z). The local minima at the angular spacing of 120° in each case are to be detected in the transmission profile as (Φ=70°, 190° and 310°, in particular. These transmission minima occur amplified by a multiple in the case of the edge measurement (curve RS). The modulation of the transmission is of the order of magnitude of approximately 5 percentage points here. This order of magnitude can be unacceptable for applications in high-performance optics, for example, for microlithography projection exposure machines.

FIG. 4 shows the results of corresponding roundness measurements for the reflectance R of the antireflection coating in the edge region RS. Pronounced maxima in the reflectance R occur at the geometric locations with transmission minima, the modulation of said reflectance being of an order of magnitude of approximately 3-4 percentage points. This goes to explain why a large part of the modulation of the transmission (FIG. 3) is caused by reflection losses.

A further analysis of the effect from checking the position of reflection minima is shown in FIG. 5 with the aid of the reflection spectra at different points in the edge region of the substrate surface measured for FIGS. 3 and 4. The various measuring points along the circumference of the sample (at Φ=0°, 130° and 310°) are equivalent in geometric terms, because they have an identical radial distance (equal height) with reference to the optical axis. Comparable properties of the antireflection coating would therefore be expected. The measurements were taken in this case for azimuth angles of Φ=130° and Φ=310° at those points at which the absolute minimum of the transmission (Φ=310°) and the absolute maximum of the transmission (Φ=130°) occurred in the roundness transmission measurement (FIG. 3). It is to be seen in FIG. 5 that the wavelength λ at which the minimum in the reflectance of the antireflection coating lies varies between approximately 164 nm and approximately 200 nm. It is therefore scarcely possible to observe tight specifications for reflection in the case of the spectral width of the antireflection effect of the conventional two-layer antireflection coatings used.

Careful analysis of the optical properties of conventionally manufactured lenses has brought the inventors to the hypothesis that the permissibly strong anisotropy of the optical properties, particularly at the edge region of strongly curved substrate surfaces, can be related to the heteroepitaxy, conventionally regarded as advantageous, of lanthanum fluoride on the calcium fluoride substrate surface. In order to verify this hypothesis, expensive investigations were carried out in which different parameters were varied during the coating (coating temperature, layer type, cleaning process etc.). The results illustrated below are consistent with a model that provides a heteroepitaxial crystal growth of $LaF_2$ on specific crystal orientations of $CaF_2$. Since crystal cuts with strongly differing orientations can occur at strongly curves lens surfaces, this can result in changes to the optical properties of the layers. The results obtained are explained below with the aid of a few representative measurement results.

Figure 6:
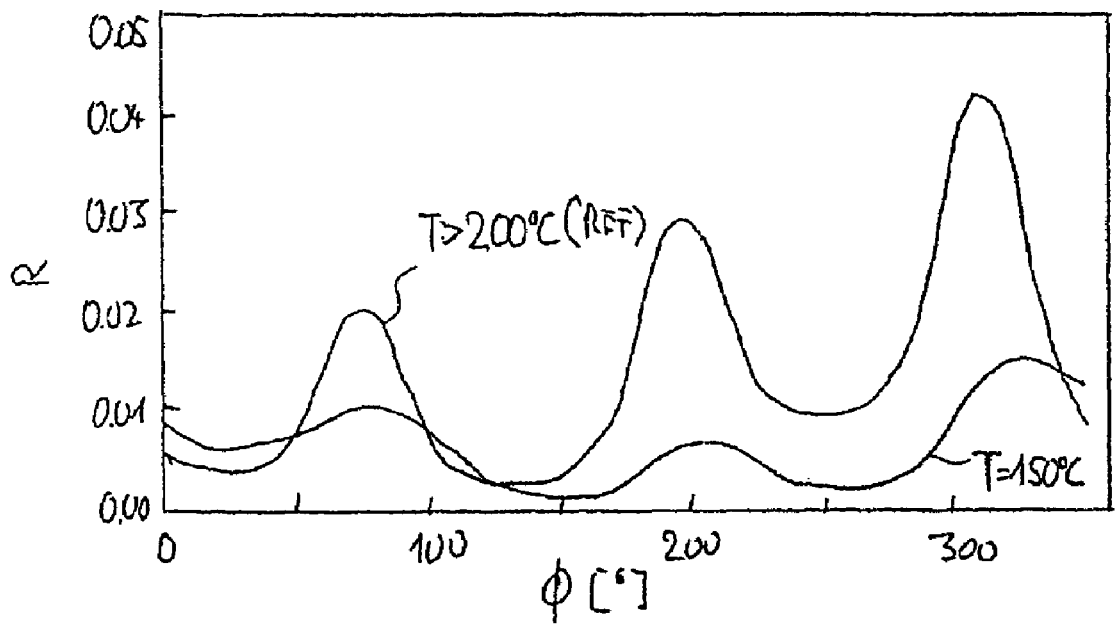
FIG. 6 shows a diagram in which the influence of the coating temperature on the reflectance in the edge region of a curved substrate surface is shown.

Firstly, the influence of the coating temperature on the anisotropy of the reflectance R is explained with the aid of FIG. 6. Here, the strongly modulated curve (T>200° C.) shows the curve, shown in FIG. 4, for the reference lens REF that was coated with an $LaF_3/MgF_2$ two-layer system. The more weakly modulated curve (T<180° C.) shows the results for a corresponding $LaF_3/MgF_2$ two-layer system that was applied at a coating temperature T<180° C. It is obvious that the lower coating temperature leads to a markedly lesser modulation with a modulation height of approximately 1 percentage point. This allows the conclusion that the mobility or surface diffusion of the vapor-deposited particles is clearly diminished by the low coating temperature in such a way that a reorganization of the particles for the purpose of forming an epitaxial first layer with a preferential direction is suppressed or reduced to such an extent that a substantially disordered, largely untextured first layer is produced. Depending on process management, this can be partially amorphous and/or polycrystalline, the crystallites of the polycrystalline first layer being substantially randomly oriented such that the formation of a preferential direction is avoided.

Figure 2:
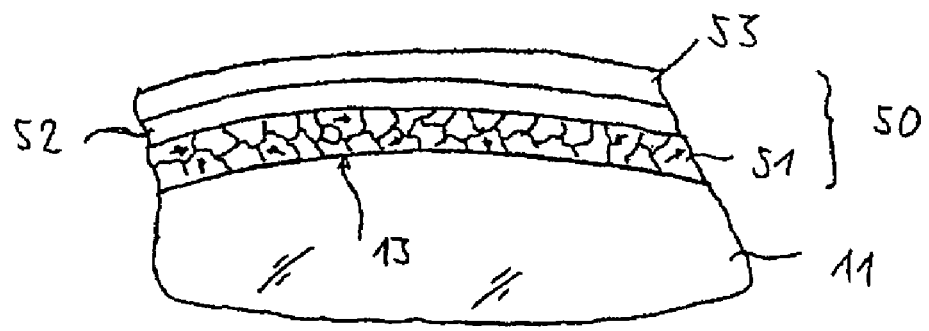
FIG. 2 shows a detailed view of a three-layer antireflection coating in accordance with an embodiment of the invention.

An embodiment of an antireflection coating 50 illustrated schematically in FIG. 2 was applied at coating temperatures of much less than 200° C., the coating temperatures being capable, in particular, of lying in the range between approximately 150° C. and approximately 190° C. What is involved is a multilayer antireflection coating comprising three layers (3-layer coating) for a design wavelength $\lambda_0$=157 nm. The first layer 51 applied directly to the substrate surface 13 consists of magnesium fluoride that is applied with a nominal optical layer thickness of 0.5 $\lambda_0$. In order to obtain a negligible optical power of this buffer layer, that is as neutral in optical terms as possible, the optical layer thickness should lie in the range $0.45<\lambda_0<0.55$. The second layer 52, lying thereupon, consists of lanthanum fluoride, and the third layer 53, lying thereupon, consists in turn of magnesium fluoride. The outer two layers 52, 53 are quarter wavelength layers (nominal optical layer thickness 0.25 $\lambda_0$). Roundness measurements were carried out on lenses coated in this way in a fashion similar to the measurements already described.

Figure 7:
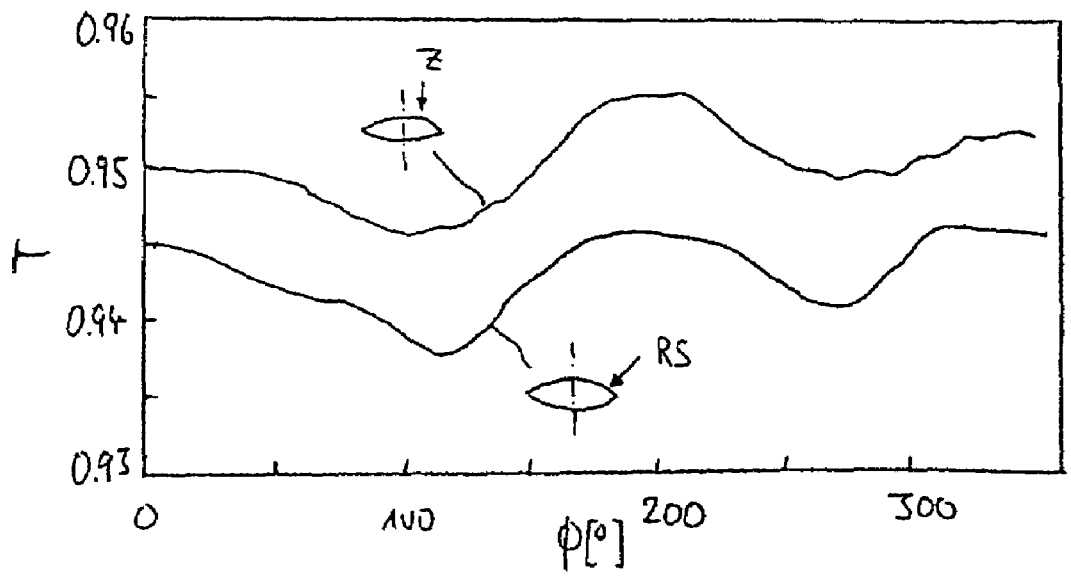
FIG. 7 shows a diagram in which the transmittance of a lens coated on both sides and having curved substrate surfaces is shown as a function of the azimuth angle for the edge region and the zone region of a lens coated in accordance with an embodiment of the invention.
Figure 9:
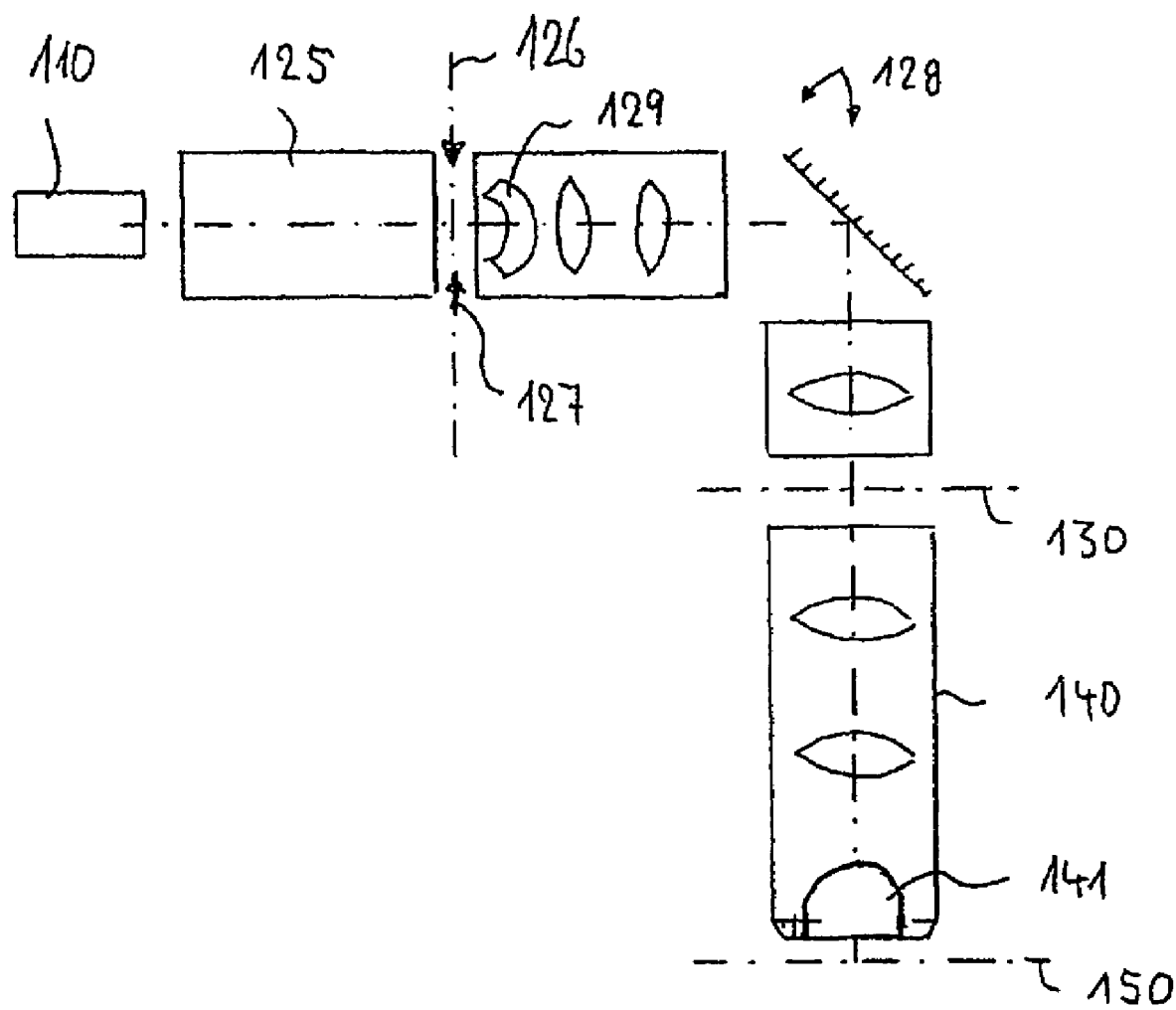
FIG. 9 shows an embodiment of a projection exposure machine for microlithography having optical components in accordance with the invention.

A low refractive index $MgF_2$ layer is used as first layer in the case of embodiments of such design (compare FIG. 2). It has emerged that this layer material grows in a substantially disordered fashion even in the case of relatively high coating temperatures such that the crystal structure of the substrate in the first layer, and thus in the coating, is not continued. Multilayer stacks made from $LaF_3/MgF_2$ can be applied thereupon, thus producing, in particular, 3-, 5- or in general 2n+1 layer systems (n=whole number). The influence of the composition of the first layer next to the substrate on the anisotropy of the transmission in the edge region of a calcium fluoride lens coated on both sides is explained with the aid of figure 7. Here, the lower curve (RS) shows the azimuthal modulation in the edge region, while the upper curve (Z) shows a modulation in the zone between optical axis and edge region. It is to be seen that the modulation height is at approximately 0.8 percentage points both in the zone region and in the edge region. The substantial improvement in a reduction of the modulation is rendered obvious by comparison with the corresponding modulation of the two-layer coating with a first layer made from lanthanum fluoride (see FIG. 3). Taking account of the fact that the edge measurements were not carried out at the outermost edge of the sample, it is possible to assume a maximum azimuthal modulation of the transmittance in the edge region of less than 1.5 percentage points, in particular of less than 1 percentage point.

The approximately 2-wave characteristic of the modulation in the case of this specific sample is ascribed to the circumstance that the <111> crystal direction of the substrate material does not coincide for this sample with the optical axis of the lens, but exhibits a substantial tilt by comparison therewith. Consequently, there is also a shift in the positions of those regions at which low refractive index net planes form the substrate surface. Given such a misorientation, irregular modulations can occur in the edge region during roundness measurements, for example in relation to the 2-waviness illustrated.

Figure 8:
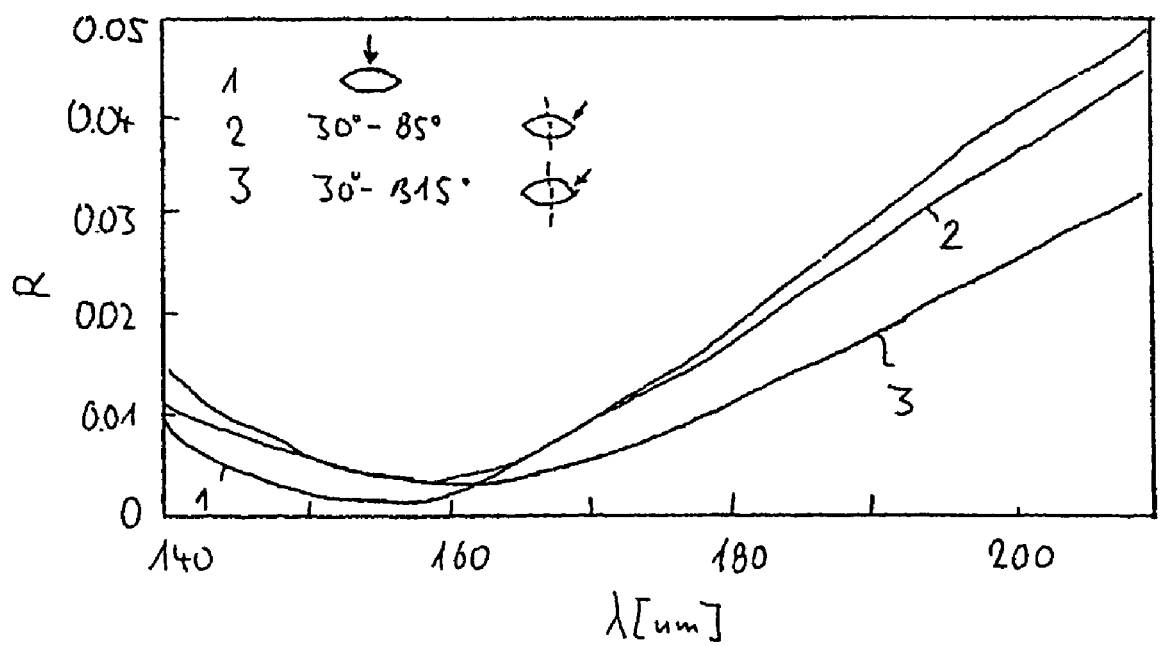
FIG. 8 shows a diagram in which the spectral position of reflection minima at a lens coated in accordance with an embodiment of the invention is shown for a middle region and an edge region.

The clear reduction in the anisotropy of the optical power by the selection of a layer material not consisting of lanthanum fluoride for the first layer is also obvious from the measurements, illustrated in FIG. 8, of the spectral profile of the reflectance R of the coating at different positions of the substrate surface. The spectral profile of the reflectance in the region near the axis, that is to say in the middle M of the substrate surface (curve 1) corresponds very well to the profile, expected from calculations, of the three-layer coating ($CaF_2|MgF_2$ 0.5 $\lambda_0|LaF_3$ 0.25 $\lambda_0|MgF_2$ 0.25 $\lambda_0$) used. In the case of the measurements for azimuth angles of 85° and 315°, there is some difference chiefly over in the level of reflection in the edge region. However, comparison with FIG. 5 makes it obvious that a significant shift in the spectral position of the reflection minimum in the case of this embodiment of an antireflection coating according to the invention does not occur. The problematic anisotropy of the coating properties can thereby be avoided.

An embodiment of a projection exposure machine 100 for microlithography is shown schematically in FIG. 8 as a possible example of application for optical components in accordance with the invention. A projection exposure machine comprises a laser light source 110 whose polarized output light is prepared with the aid of an illumination system 120 and is transmitted into an exit plane 130 of the illumination system in which a structurally supportive transmission mask (reticle) is located. With the aid of a projection objective 140 of high numerical aperture, the pattern of the mask is transmitted into the image plane 150 of the projection objective in which a substrate (for example semiconductor wafer) coated with a light-sensitive layer is arranged.

The illumination system comprises a group 125 of optical devices that serve the purpose of providing in a field plane 126 of the illumination system a homogeneously illuminated illumination field with a defined angular distribution of the incident radiation, it normally being possible for the angular distribution to be adapted to the type of structure of the reticle. Seated next to the field plane 126 is an adjustable field stop 127 for limiting the field with sharp edges. An imaging objective 128 following the field plane images the field plane 126 onto the reticle. Arranged as first element at the entrance of the imaging objective 128 is a meniscus lens 129 that is concave toward the field plane 126, has a strongly curved entrance surface and a comparably strongly curved exit surface, and, ideally, serves the purpose of setting the telecentricity of the radiation.

The projection objective 140, which can be of dioptric or catoptric design, typically has an image-side numerical aperture $NA \geq 0.7$. In the case of the example, there is provided as last optical element upstream of the image plane 150 a planoconvex lens 141 with a flat exit surface and strongly curved, spherical entrance surface that brings together with low aberration relative to the image plane 150 radiation occurring with high aperture.

The meniscus lens 129 of the imaging system 128, and the planoconvex lens 141 of the projection objective 140 are typical examples of lenses in imaging systems that are operated with high aperture and are located near field planes, and whose transmission properties should be as uniform as possible with regard both to intensity errors and to wavefront errors. In the case of operating wavelengths of 157 nm or therebelow, most or all transparent optical components consist of calcium fluoride or another suitable crystalline rare-earth fluoride material, for example, barium fluoride, since other sufficiently transparent materials are not available. Even in the case of systems for an operating wavelength of 193 nm, lenses fitted near the field frequently consist of calcium fluoride in order to avoid in these regions of high radiation energy density changes in properties of the optical system resulting from radiation-induced changes in density (in particular compaction). The invention is therefore of great benefit particularly in the field of microlithography for operating wavelengths from the deep ultraviolet (DUV) region.

The advantages of the invention have been explained in detail here with the aid of a few exemplary embodiments. The person skilled in the art will recognize that the advantages of the invention can be used in the case of strongly convexly, or of strongly concavely curved substrate surfaces. Although the problems have been explained with the aid of <111>-oriented calcium fluoride lenses, the benefit of the invention is not limited to such lenses. Similar advantages result, in particular, in the case of fluoride crystal lenses whose optical axes are oriented in a fashion substantially parallel to other low index crystal directions of the cubic system, that is to say substantially parallel to a <100> direction or substantially parallel to a <110> direction.

In general, the problems presented here can occur with all curved substrate surfaces made from crystal substrates in the case of which different net planes form the substrate surface, the anisotropy possibly resulting being particularly pronounced according to the results shown here whenever, at at least one location of a substrate surface, a low index crystal direction coincides with the normal direction of the substrate surface. Consequently, the effect can occur even in the case of substrate surfaces whose curvature is weaker than that of the examples shown here.

The considerations on which the invention is based can also be used to an advantage in the case of the coating of lenses having small curvatures, and of plane-parallel plates having randomly oriented, monocrystalline substrate material. With series production, for example, it can occur in this case that the surfaces of lenses or plane-parallel plates differ in crystallographic terms, although the geometry of the substrates is identical. In particular, it can occur that one or a few of the optical components have a substrate surface that is parallel, at least at one location, to low index net planes of the crystal material, whilst this is not the case, or not to such a pronounced extent, for other elements. Were such substrates coated with a first layer made from lanthanum fluoride under such conditions as to lead to an epitaxy between substrate and first layer, the first layers, and therefore also the multilayer system based on them, could have different optical properties despite geometrically identical substrates and identical coating conditions, since the growth behavior of the first layer could differ from lens to lens or plate to plate. It can therefore be advantageous to manufacture the first layer in a coating method for substrates with randomly oriented substrate material such that it has a substantially untextured layer structure and can therefore serve as buffer layer in order to form a uniform growth surface for the dielectric layers following therefrom, independently of the substrate orientation. The manufacturing stability can thereby be increased.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

What is claimed is:

1. An optical component comprising:
   a substrate, on which at least one curved substrate surface is formed that defines an optical axis of the optical component,
   wherein the substrate surface is coated with a multilayer coating that is active in the ultraviolet region at a design wavelength $\lambda_0$ and comprises a first layer, applied to the substrate surface, made from a first dielectric material and at least one second layer, applied to the first layer, made from a second dielectric material,
   wherein the substrate consists essentially of a crystal material that has an axially parallel crystal direction, running parallel to the optical axis, and edge crystal directions perpendicular to edge regions of the curved substrate surface,
   wherein an angle between the axially parallel crystal direction and the edge crystal directions is at least 17°, and the first layer has an essentially untextured layer structure, and,
   wherein the axially parallel crystal direction deviates by less than 15° from a low index crystal direction of the crystal material.

2. The optical component as claimed in claim 1, wherein the axially parallel crystal direction deviates by less than 3° from a <111> direction or a <110> direction or a <100> direction of the crystal material.

3. The optical component as claimed in claim 1, which is a lens having a substrate made from a crystal material transparent to the radiation of the design wavelength, wherein the multilayer coating is designed as a multilayer antireflection coating.

4. The optical component as claimed in claim 3, which has a spatially dependent transmittance that has a variation width of less than 1 percentage point over the cross section of the substrate surface.

5. The optical component as claimed in claim 3, wherein a transmittance in the edge region has a variation width in the circumferential direction that is less than 1 percentage point.

6. The optical component as claimed in claim 1, which is designed for a design wavelength of 120 nm<$\lambda_0$<260 nm.

7. The optical component as claimed in claim 1, wherein the substrate consists essentially of a fluoride crystal material that is selected from the group consisting of calcium fluoride (CaF2) and barium fluoride (BaF2).

8. A method for manufacturing an optical component as in claim 1 having a substrate, on which at least one curved substrate surface is formed that defines an optical axis of the optical component and that is coated with a multilayer coating that is active in the ultraviolet region at a design wavelength $\lambda_0$, wherein the substrate consists of a crystal material that has an axially parallel crystal direction running parallel to the optical axis, and edge crystal directions perpendicular to edge regions of the curved substrate surface, wherein an angle between the axially parallel crystal direction and the edge crystal directions is at least 17°, comprising:
 coating the substrate surface with a first layer made from a first dielectric material; and
 coating the first layer with at least one second layer, applied to the first layer, made from a second dielectric material, wherein the first layer is applied such that the first layer has an at least essentially untextured layer structure.

9. An optical component comprising:
a substrate, on which at least one curved substrate surface is formed that defines an optical axis of the optical component,
wherein the substrate surface is coated with a multilayer coating that is active in the ultraviolet region at a design wavelength $\lambda_0$ and comprises a first layer, applied to the substrate surface, made from a first dielectric material and at least one second layer, applied to the first layer, made from a second dielectric material,
wherein the substrate consists essentially of a crystal material that has an axially parallel crystal direction, running parallel to the optical axis, and edge crystal directions perpendicular to edge regions of the curved substrate surface,
wherein an angle between the axially parallel crystal direction and the edge crystal directions is at least 17°, and the first layer has an essentially untextured layer structure, and
wherein the curved substrate surface runs such that low index crystal directions of the crystal material are perpendicular to the substrate surface at at least two different surface regions of the substrate surface.

* * * * *